United States Patent [19]

Wu

[11] Patent Number: 5,879,169
[45] Date of Patent: Mar. 9, 1999

[54] CARD CONNECTOR

[75] Inventor: Kun-Tsan Wu, Tu-Chen, Taiwan

[73] Assignee: Hon Hai Precision Ind. Co., Ltd., Taipei Hsien, Taiwan

[21] Appl. No.: 620,761

[22] Filed: Mar. 18, 1996

[51] Int. Cl.[6] .................................................. H01R 9/09
[52] U.S. Cl. ............................................. 439/74; 439/940
[58] Field of Search ................................. 439/74, 83, 69, 439/630, 929, 940, 872, 873, 862, 81, 82; 361/734, 393

[56] References Cited

U.S. PATENT DOCUMENTS

| | | | |
|---|---|---|---|
| 4,356,532 | 10/1982 | Donaher | 361/393 OR |
| 4,457,573 | 7/1984 | Bailey | 439/736 X |
| 5,249,977 | 10/1993 | Tanaka et al. | 439/83 X |
| 5,259,777 | 11/1993 | Schuder et al. | 439/630 X |
| 5,306,163 | 4/1994 | Asakawa | 439/74 OR |
| 5,309,324 | 5/1994 | Herandez et al. | 361/734 OR |
| 5,350,573 | 9/1994 | Kondo | 439/862 OR |

FOREIGN PATENT DOCUMENTS

| | | | |
|---|---|---|---|
| 0096753 | 6/1984 | Japan | 357/75 OR |

*Primary Examiner*—Paula Bradley
*Assistant Examiner*—Daniel Wittels

[57] ABSTRACT

An IC card connector (10) including an insulative housing (12) having a plurality of cavities (14) extending therethrough in a vertical direction for receiving a corresponding number of contacts (16) therein. Each contact (16) includes a surface mounting tail (40) which is pressed against by a corresponding standoff (42) formed on a bottom surface (38) of the housing (12). A significant space (36) is formed on the underside of the housing (12) generally below the cavities (14) for allowing mounting plural tiny components (102) thereunder on the PC board (100). A stopper (48) is formed on the bottom portion of each cavity (14) for supportable engagement with the corresponding downward flexed contact (16) when the IC card is pressed on the housing (12). A pair of recesses (52) are formed on two sides of the housing (12) each with a bump (54) therein for engagement with a plate device (50) which is optionally attached to the top surface (30) of the housing (12) for installation of the connector (10) on the PC board (100) by suction.

9 Claims, 8 Drawing Sheets

CARD CONNECTOR

BACKGROUND OF THE INVENTION

1. Field of The Invention

The Invention relates to card connectors, and particularly to the connector for use within the cellular phone for receiving an identification card therein.

2. The Prior Art

IC cards other than the standard memory cards or I/O cards, are also popularly used in the communication field. Different from the memory cards and I/O cards each of which adopts a standardized 68 pins memory card host connectors as an interface device for interconnection with the computer and as a complementary connector for coupling to the 68 positions socket connector built in the memory card, IC cards each generally uses the connector having a plurality of spring contacts facing up for engagement with a corresponding number of circuit pads printed on the surface of the IC card which faces down toward the connector wherein such IC card is substantially secured to the connector in the vertical direction for resisting the upward forces caused by the restoring force of the contacts of the connector. The IC card connectors may be referred to U.S. Pat. Nos. 4,820,186, 4,843,223, 4,902,233, 4,013,255, 5,169,345, 5,224,873, 5,226,826, 5,231,274, 5,259,777, 5,320,552, 5,337,220, 5,425,651 and 5,470,260. Generally speaking, for efficiently holding the IC card with regard to the connector, there is a cover directly attached to the connector as shown in some of the aforementioned patents. Anyhow, a recent attempt in the cellular phone having an IC card therein, is to use the lid of the cellular phone for holding the IC card against the IC card connector instead of using the cover of the connector, and therefore the structure of such IC card connector can be simplified by removing therefrom the attached cover shown in the prior arts.

An object of the invention is to provide an IC card connector having the simplified structure for easy self-assembling and installation on the PC board, and convenient engagement with the IC card used within the phone set.

SUMMARY OF THE INVENTION

According to an aspect of the invention, an IC card connector including an insulative housing having a plurality of cavities extending therethrough in a vertical direction for receiving a corresponding number of contacts therein. Each contact includes a surface mounting tail which is pressed against by a corresponding standoff formed on a bottom surface of the housing. A significant space is formed on the underside of the housing generally below the cavities for allowing mounting plural tiny components thereunder on the PC board. A stopper is formed on the bottom portion of each cavity for supportable engagement with the corresponding downward flexed contact when the IC card is pressed on the housing. A pair of recesses are formed on two sides of the housing each with a shoulder therein for engagement with a plate which is optionally attached to the top surface of the housing for installation of the connector on the PC board by suction.

DETAILED DESCRIPTION OF THE PREFERRED EMBODIMENT

References will now be made in detail to the preferred embodiments of the invention. While the present invention has been described with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
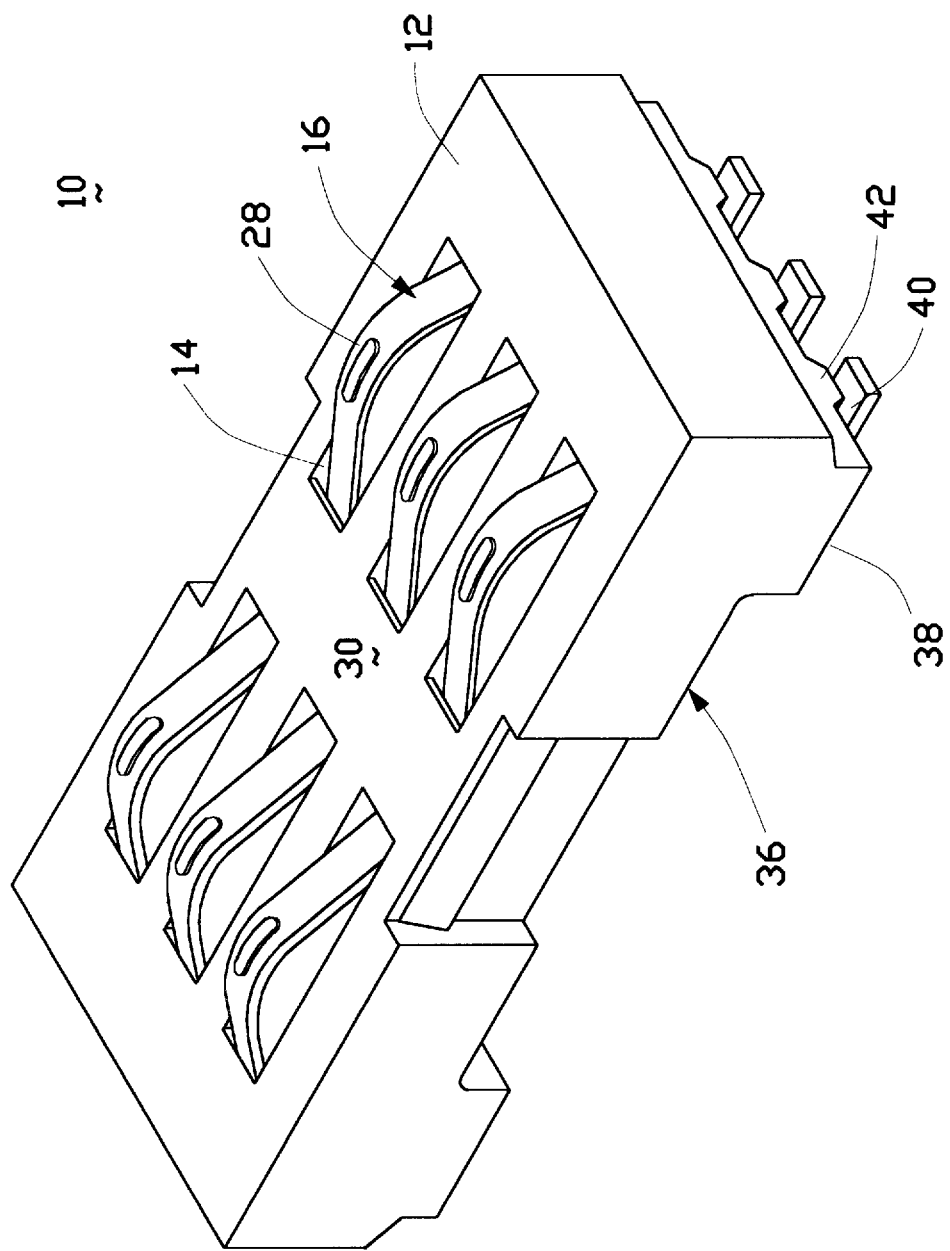
FIG. 1 is a top perspective view of an IC card connector with the contacts therein according to the invention.
Figure 2:
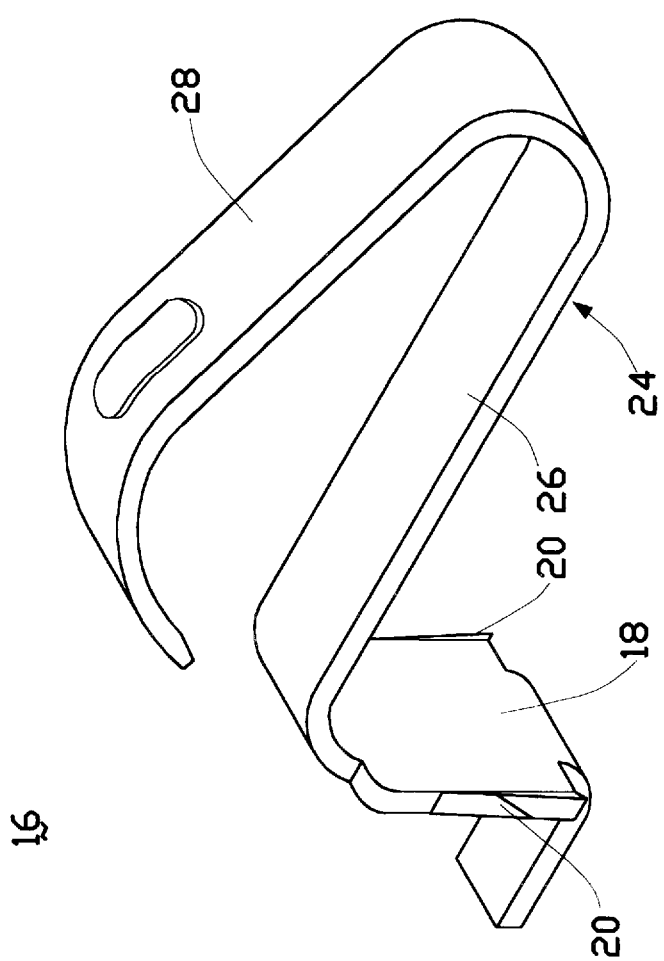
FIG. 2 is a perspective view of the contact of FIG. 1.
Figure 3:
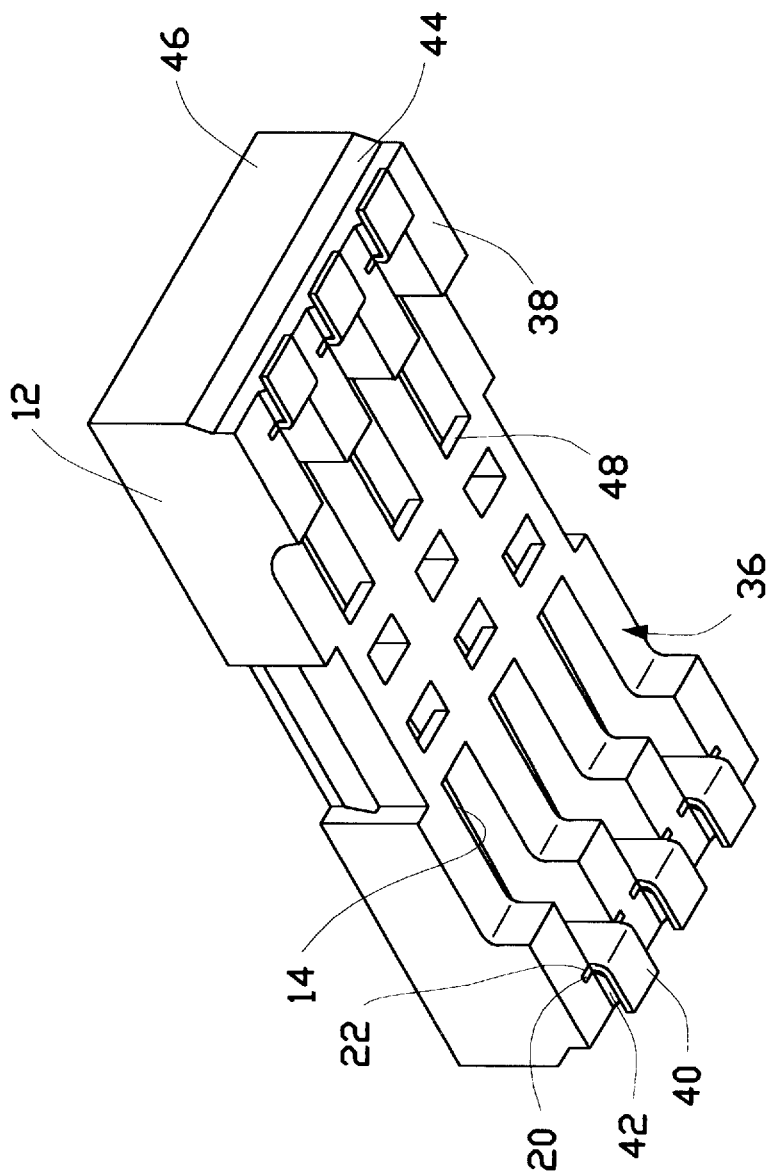
FIG. 3 is a bottom perspective view of the connector of FIG. 1 to show the bottom structure thereof.

It will be noted here that for a better understanding, most of like components are designated by like reference numerals throughout the various figures in the embodiments. Attention is directed to FIGS. 1–3 wherein an IC card connector 10 includes an insulative housing 12 with a plurality of cavities 14 extending through in a vertical direction for receiving a corresponding number of contacts 16 therein.

Figure 4A:
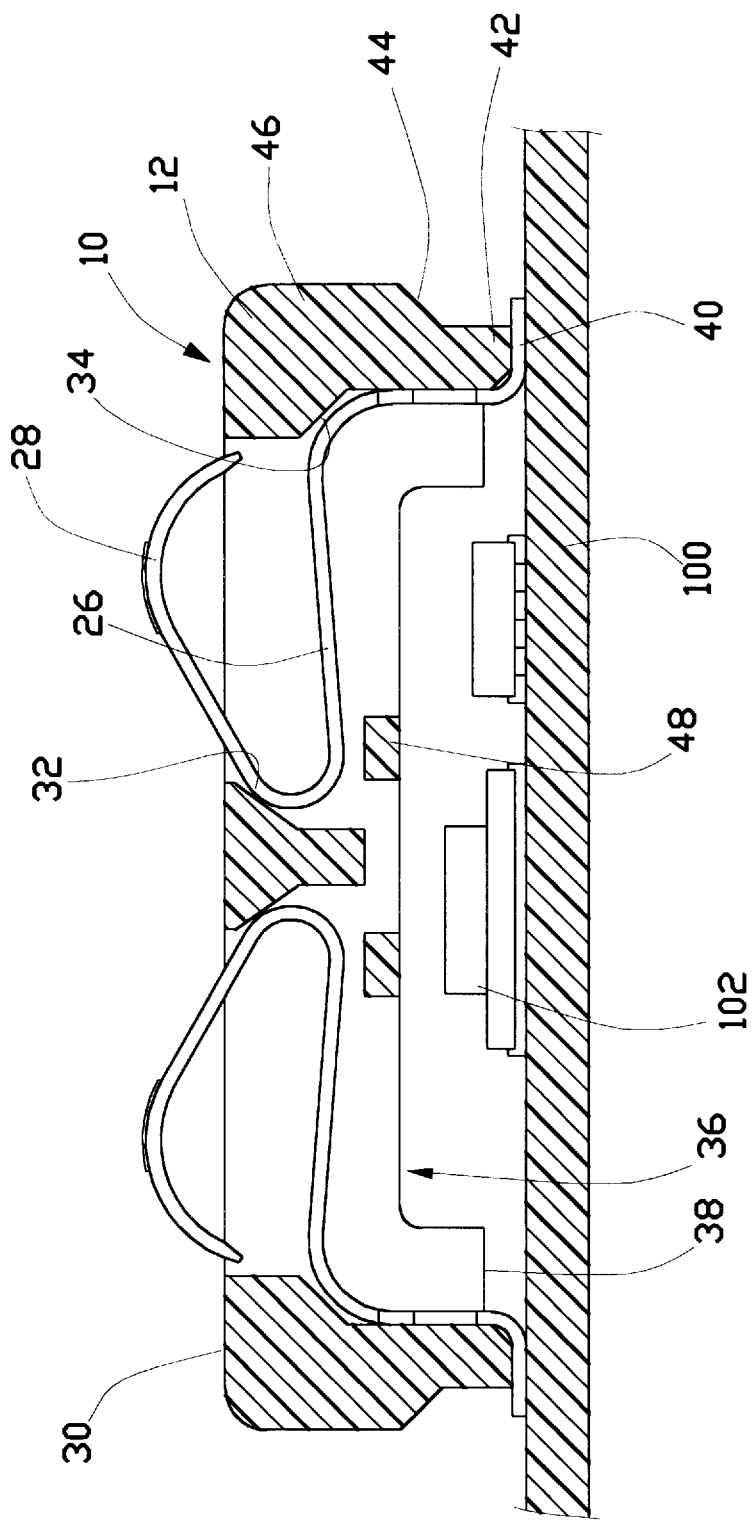
FIG. 4(A) is a cross-sectional view of the connector of FIG. 1 to show how the contact is received within the cavity.
Figure 4B:
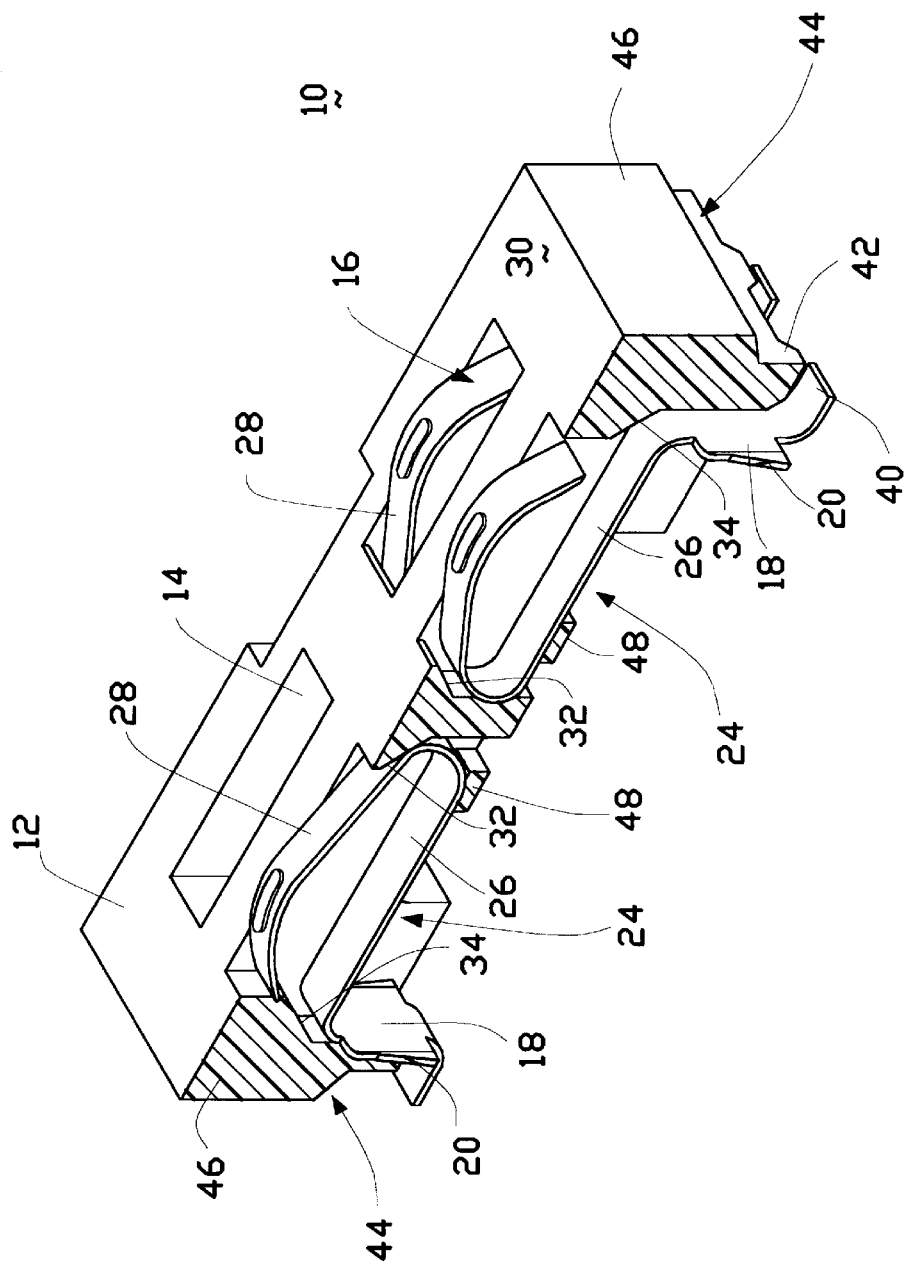
FIG. 4 (B) is a fragmentary perspective view of the connector of FIG. 1 to show the contact is engaged within the cavity.

Also referring to FIGS. 4(A) and 4 (B), each contact 16 includes a main body 18 with retention barbs 20 on two sides for engagement within the corresponding slots 22 in the corresponding cavity 14. A spring beam 24 extending from the top of the main body 18, includes a horizontal section 26 directly connected to the main body 18, and an upward extending curved engaging section 28 wherein a portion of the engaging section 28 protrudes out of the top mating surface 30 of the housing 12. To comply with the configuration of the spring beam 24, a pair of chamfers 32 and 34 are formed on two opposite corners in the cavity 14.

A middle portion on the underside of the housing 12 has been removed therefrom to form a space 36 recessed from the bottom surface 38 of the housing 12 under the region of the cavities 14 so that plural electrical components 102 can be mounted on the PC board 100, on which the connector 10 is mounted, under the housing 12 and in such space 36.

Oppositely, corresponding to each contact tail 40 which integrally extends horizontally and outwardly from the bottom of the main body 18 of the contact 16, a standoff 42 extends downward on the outermost portion of the housing 12 which the tail 40 of the contact 16 can abut against. This assures coplanarity of the contact tails 40 and provides a proper ventilation area for soldering of the contact tail 40. Moreover, to ease inspection or rework of the soldering of the tails 40 of the contact 16, an elongated indent 44 is formed along each side wall 46.

Therefore, when assembled, the contacts 16 are inserted into the cavities 14 of the connector 10, respectively, from the bottom. During this assembling, with proper assembling tools, the contact 16 is first moved toward the housing 12 from the bottom at an angle to have the spring beam 24 pass the stopper 46 and then have the contact 16 upward move within the cavity 14 whereby the retention barbs 20 of the main body 18 can be engaged within the slots 22 in the housing 12. It should be noted that the pair of chamfers 32 and 34 in each cavity 14 provide guidance of contact assembling in the cavity 14 without improper interference.

After assembled, the connector 10 can be solderably mounted on the PC board and adapted to engage an IC card (not shown) which is downward pressed by the lid of the phone set (not shown) to cover the top surface 30 of the housing 12 and to have its circuit pads engaged with the protruding engagement section 28 of the contact 16 of the connector 10. Understandably, the spring beam 24 will be downward deflected when the IC card is actuated thereon. To avoid the spring beam 24 from deforming over its limits, each cavity 14 further includes a stopper 48 on the bottom so that the downward flexed horizontal section 26 of contact 16 can be stopped and supported by the stopper 48 when the IC card is loaded onto the connector 10.

It can be seen that to increase the resiliency of the spring beam 24, the horizontal section 26 extends through the whole lengthwise dimension of the cavity 14, and the engagement section 28 successively extends upward and curvilinearly in a folded back manner and also almost utilizes the full lengthwise dimension of the cavity 14.

Figure 5:
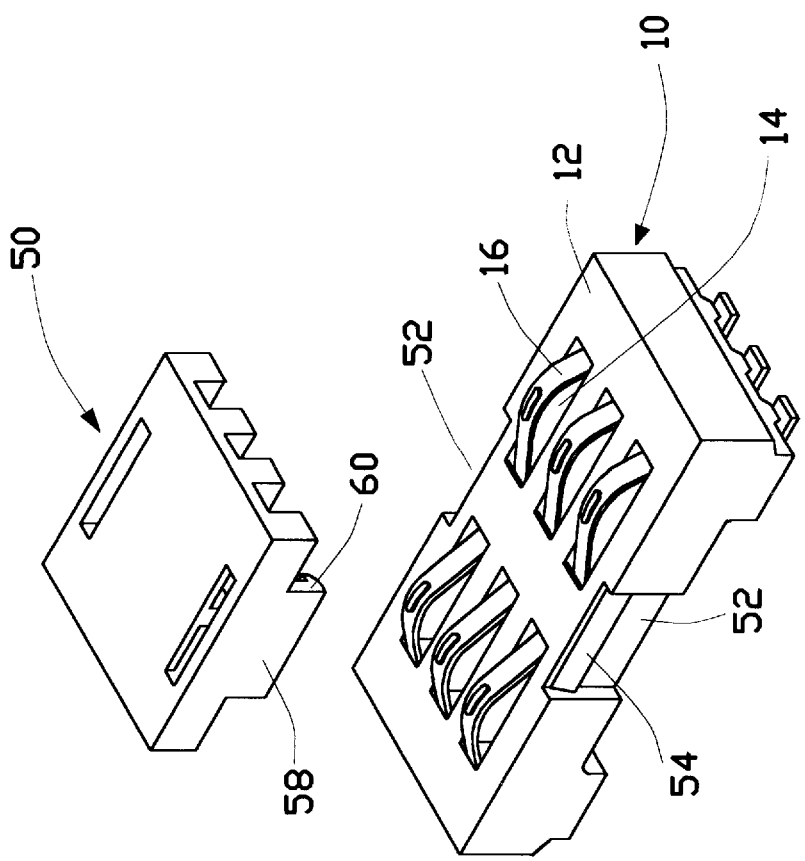
FIG. 5 is a top perspective view of the connector of FIG. 1 and an auxiliary plate device which is ready to be optionally attached thereto.
Figure 6:
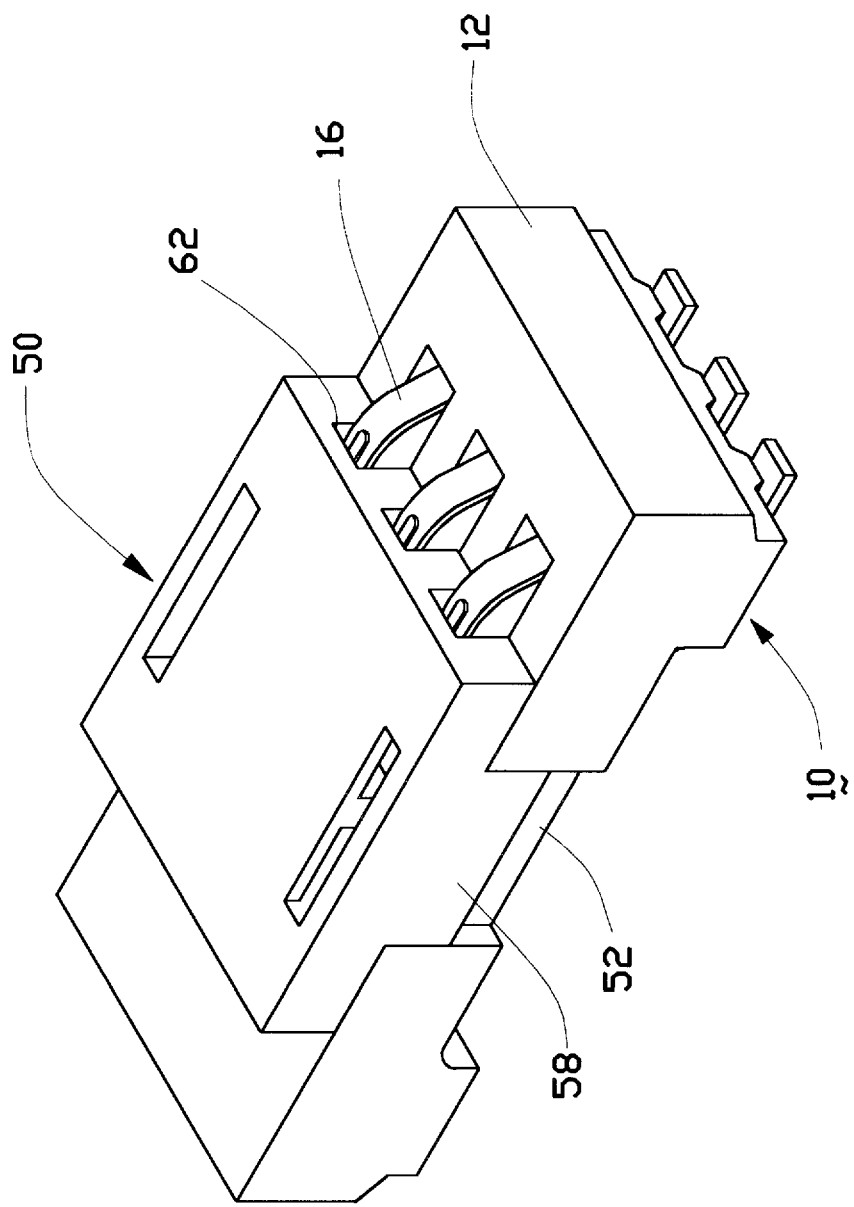
FIG. 6 is a top perspective view of the assembled connector with thereon the associated plate device of FIG. 6.
Figure 7:
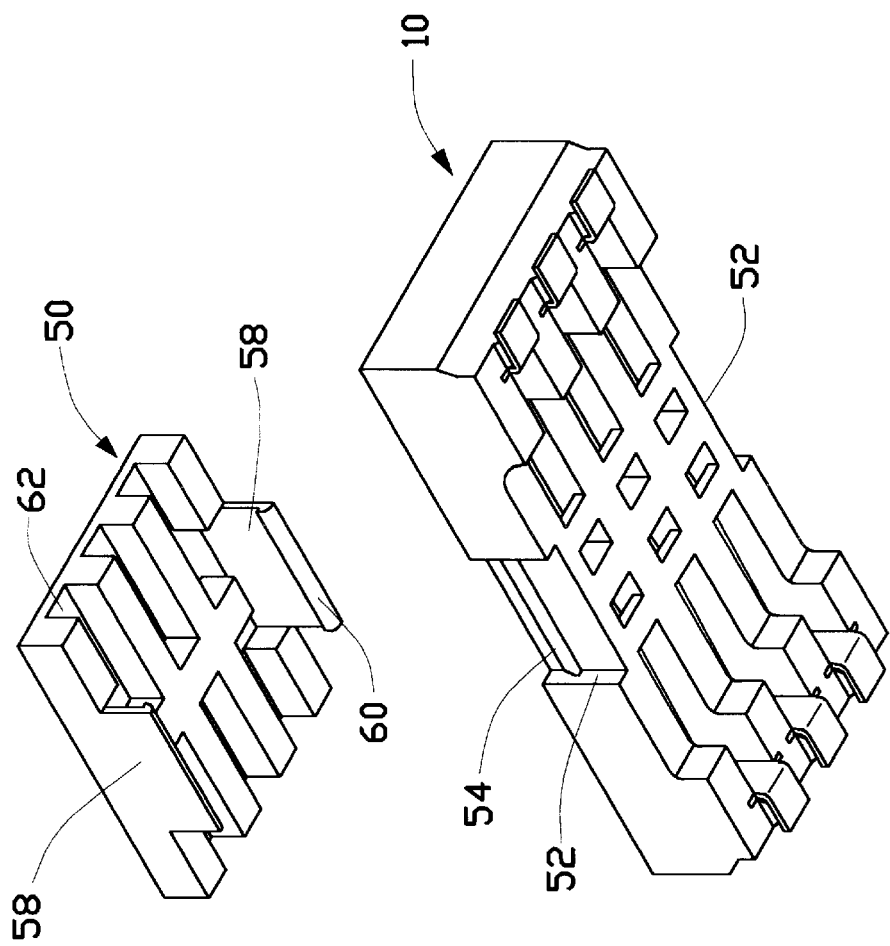
FIG. 7 is a bottom perspective view of the connector and the auxiliary plate device of FIG. 6 to show the bottom structure of the auxiliary plate device.

In addition and referring to FIGS. 5–7, to facilitate solderably mounting the connector 10 on the PC board 100 via a suction process, an auxiliary plate device 50 can optionally and detachably attached to the housing 12 of the connector 10. To receive such auxiliary plate device 50, a recess 52 is formed on each lateral side of the housing 12 with a bump 54 horizontally extending therein. Correspondingly, the auxiliary plate device 50 further includes a pair of side walls 58 on two sides each with a hook 60 at the bottom thereof. Therefore, the auxiliary plate device 50 can be securely attached to the housing 12 of the connector 10 from the top wherein two side walls 58 of the plate device 50 can be received in the corresponding recesses 52, respectively, with the hooks 60 engaged with the corresponding bumps 54 in the recesses 52. Thus, a suction nozzle in the assembling machine can confront and be covered by the plate device 50 for installation of the connector 10 on the PC board. It can be appreciated that after the connector 10 is soldered onto the PC board, the auxiliary plate device should be removed from the housing 12 by manually releasing the locking between the hooks 60 of the plate device 50 and the bumps 54 in the recesses 52, such that the engagement sections 28 of the contacts 16 of the connector 10 are fully exposed to an exterior for access of the IC card.

It is noted that the plate device 50 should includes a plurality of channels 62 on the undersurface (FIG. 7) corresponding to the cavities 14 of the connector 10 for receiving portions of the engagement sections 28 of the contacts 16 which project out of the top surface 30 of the connector 10. It is also contemplated that the top mating surface 30 should be sufficiently large to stably support the IC card thereon, and also be sufficiently small to have the whole dimension of the housing 12 within the limited range of the designated layout on the PC board.

While the present invention has been described with reference to specific embodiments, the description is illustrative of the invent and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. An IC card connector for use within a cellular phone, comprising:

an insulative housing having a plurality of cavities extending therethrough in a vertical direction for receiving a corresponding number of contacts therein;

each of said contacts including a main body, a spring beam for engagement with the IC card, and a tail for solderably mounting on a PC board;

a plurality of standoffs formed on a bottom portion of the housing in alignment with the corresponding cavities, respectively, for respective engagement with the corresponding tails of the contacts and having said contacts sandwiched between the standoffs and the PC board.

2. The connector as described in claim 1, wherein a space is formed on an underside of the housing under the cavities for receiving plural electrical components mounted on the PC board.

3. The connector as described in claim 1, wherein each cavity has a stopper formed on a bottom portion for preventing the spring beam from overbending.

4. The connector as described in claim 1, wherein the spring beam includes a horizontal section and an upward extending curved engagement section, and a portion of the engagement section projects out of a top surface of the housing.

5. The connector as described in claim 1, wherein each cavity has a pair of chamfers therein corresponding to the spring beam of the contact for allowing bottom loading of the contact into the cavity.

6. The connector as described in claim 1, wherein a pair of elongated indents are formed along a first pair of side walls of the housing.

7. The connector as described in claim 1, wherein a pair of recesses are formed on second pair of side walls of the housing, and each recess has a bump therein for cooperation with an optional auxiliary plate device attached thereto.

8. A connector assembly for use with an IC card and mounting to a PC board, comprising:

an insulative housing having a plurality of cavities extending therethrough in a vertical direction for receiving therein a corresponding number of contacts wherein each contact has an engagement section projecting out of a top mating surface of the housing for engagement with the IC card;

an auxiliary plate device optionally detachably attached to the housing;

means for fastening the auxiliary plate device to the housing; and a plurality of channels formed on an underside of the auxiliary plate device and in respective alignment with the cavities of the housing in a vertical direction for receiving the projecting engagement sections of the contacts, respectively.

9. The connector assembly as described in claim 8, wherein said means includes at least a recess formed on a lateral side wall on the housing with a bump therein, and at least a side wall extending downward from the auxiliary plate device with a hook at a bottom end for engagement with said bump.

* * * * *